Patented Mar. 2, 1948

2,437,231

UNITED STATES PATENT OFFICE 2,437,231

COPOLYMERS OF STYRENE AND A BETA-CYANOACRYLATE

David T. Mowry, Dayton, Ohio, assignor to Monsanto Chemical Company, a corporation of Delaware No Drawing. Application July 10, 1943, Serial No. 494,243

7 Claims. (Cl. 260—86)

The present invention relates to the production of polymerization products.

An object of the present invention is to provide copolymerization (or inter-polymerization) products of vinyl aromatic hydrocarbons such as styrene which copolymerization products are characterized by improved thermal stability and mechanical strength.

I have found that valuable polymerization products may be obtained by polymerizing at least one vinyl-substituted aromatic hydrocarbon, for example, styrene, in admixture with one or more compounds having the general structure:

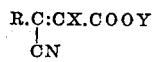

wherein R and X are respectively H and H, H and Cl, H and CH₃ and CH₃ and H, and Y represents H or a hydrocarbon radical of from 1 to 5 carbon atoms. Examples of such compounds are: beta-cyanoacrylic acid, alpha-chloro-beta-cyanoacrylic acid, alpha-methyl-beta-cyanoacrylic acid, beta-cyanocrotonic acid, methyl beta-cyanoacrylate, methyl alpha-chloro-beta-cyanoacrylate, methyl alpha-methyl-beta-cyanoacrylate, methyl beta-cyanocrotonate, ethyl beta-cyanoacrylate, ethyl alpha-chloro-beta-cyanoacrylate, ethyl alpha-methyl-beta-cyanoacrylate, ethyl beta-cyanocrotonate, propyl beta-cyanoacrylate, propyl alpha-chloro-beta-cyanoacrylate, propyl alpha-methyl-beta-cyanoacrylate, propyl beta-cyanocrotonate, butyl beta-cyanoacrylate, butyl alpha-chloro-beta-cyanoacrylate, butyl alpha-methyl-beta-cyanoacrylate, butyl beta-cyanocrotonate, amyl beta-cyanoacrylate, amyl alpha-chloro-beta-cyanoacrylate, amyl alpha-methyl-beta-cyanoacrylate and amyl beta-cyanocrotonate. The cis- and trans-compounds are equally usable for the present products. When Y represents hydrocarbon radicals of from 1 to 5 carbon atoms, such radicals may be derived from the alcohols, methyl, ethyl, propyl, butyl and amyl in which case the alcohols propyl, butyl and amyl may comprise either the normal or the iso-alcohol.

The present copolymers may be produced either by mass, emulsion, solution or suspension polymerization methods. The copolymerization may be made to take place either in the absence of a catalyst or in the presence of such oxygen yielding compounds as benzoyl peroxide, ammonium persulfate, hydrogen peroxide, etc. The temperature employed is preferably maintained within the range of 60° C. to 80° C., although for certain purposes it may range from 50° C. to 125° C. Generally it is advantageous to employ a temperature above 50° C. but below 100° C. for the initial part of the polymerization and then to subject the polymer so formed to a short heat hardening treatment, wherein the temperature is raised to above 100° C., but below 125° C.

The preferred proportions employed for producing my resinous products may consist generally of from 1% to 50% of the nitrile, although the more valuable products are prepared utilizing from 10% to 50% by weight of the nitrile in the resin.

The present products in their clear and transparent form may be employed for the production of transparent objects such as windshields and the like, or for transparent molded articles, for insulating and dielectric materials, etc.

It is known that solid resinous products may be obtained by polymerizing monomeric styrene together with a variety of unsaturated organic compounds containing olefinic linkages and I am aware of the polymerization of mixtures of styrene and nitriles containing the vinyl or isopropenyl groups such as acrylonitrile or methacrylonitrile. A vinyl or isopropenyl compound like acrylonitrile or methacrylonitrile may polymerize alone, i. e., in the absence of an additional unsaturated compound such as styrene. On the other hand, the unsaturated beta-cyano esters of the present invention do not undergo polymerization of auto-condensation under ordinary conditions.

Members of the above general formula having the structure:

where Y is an alkyl group of from 1 to 5 carbon atoms, are disclosed in my copending application Serial No. 481,879, dated April 5, 1943, now abandoned, and dealing with the preparation of new beta-cyanocrotonic acid esters. Compounds having the structure:

where Y is hydrogen or a methyl or ethyl group are disclosed in a joint copending application with M. Renoll, Serial No. 481,584, dated April 2, 1943, now abandoned, and dealing with the preparation of new unsaturated chloronitriles.

The invention is further illustrated, but not limited, by the following examples:

Example 1

A mixture consisting of approximately 70 parts by weight of styrene and 30 parts by weight of methyl beta-cyano-acrylate was copolymerized in the presence of 0.1% by weight of benzoyl peroxide at a temperature of 67° C. for 6 days and then at a temperature of 100° C. for 5 days. There was thus obtained a hard, substantially colorless resin having an alcohol soluble content of 2.9%. Comparison of the thermal characteristics of this copolymer resin with that obtained by the polymerization of styrene, alone, under identical polymerization conditions gave the following results as determined on the Maquenne bar:

| | Melting Point, °C. | Softening Point, °C. | Decomposition Point, °C. |
|---|---|---|---|
| Styrene—methyl beta-cyano-acrylate copolymer (7:3) | 247 | 150 | 190 |
| Styrene polymer | 230 | 130 | 170 |

*Example 2*

A mixture consisting of 90 parts by weight of styrene and 10 parts by weight of ethyl alpha-chloro-beta-cyanoacrylate was copolymerized at a temperature of 80° C. for 8 days and then at a temperature of 105° C. for 4 days. There was thus obtained a hard, substantially colorless resin having an alcohol-soluble content of 2.3% and a softening point of 115° C. When styrene, alone, is polymerized under the same conditions, the softening point of the polystyrene obtained is 110° C.

*Example 3*

A mixture consisting of 90% by weight of styrene and 10% by weight of trans-ethyl beta-cyanocrotonate was copolymerized in the presence of 0.1% benzoyl peroxide at a temperature of 80° C. for 10 days and a temperature of 110° C. for 2 days. There was thus obtained a hard, practically colorless resin having an alcohol-soluble content of 1.9%. Strips cut from the resin had a flexural strength of 10,300 lbs./sq. in. Comparison of the thermal characteristics of the present copolymer with a polystyrene prepared under identical polymerizing conditions gave the following results:

| | Melting Point, °C. | Decomposition Point, °C. |
|---|---|---|
| Styrene—trans-ethyl beta-cyanocrotonate copolymer | 200 | 220 |
| Polystyrene | 190 | 210 |

The values for flexural strength given in this example were determined by employing a test bar measuring 0.08" x 0.5" x 1.0" and a model J-2 Scott tester, which tester had been modified by a special support having curved edges with a radius of 0.0625" and spaced at a distance of 0.625", the test bar being laid flat on said supports.

*Example 4*

A mixture consisting of 60 parts by weight of styrene and 40 parts by weight of methyl beta-cyanoacrylate was copolymerized in the absence of a catalyst for 16 days at a temperature of 67° C. and then for 9 days at a temperature of 105° C. The product was a hard, water-white, transparent resin having an alcohol-soluble content of 3.2%. The heat distortion point of the copolymer was 100° C. as compared with 75° C. for polystyrene prepared under the same conditions. Another copolymer consisting of 70 parts by weight of styrene and 30 parts by weight of methyl beta-cyanoacrylate polymerized under similar conditions had the following thermal properties:

| | Softening Point, °C. | Melting Point, °C. | Decomposition Point, °C. |
|---|---|---|---|
| Polystyrene | 130 | 230 | 170 |
| Copolymer | 150 | 247 | 190 |

The above values for softening, melting and decomposition points were determined on the Maquenne bar. The values for heat distortion points were determined according to the procedure described in the American Society for Testing Materials, Specification D648-41T and found on page 1066 of the American Society for Testing Materials, Book of Standards for 1942, except that the dimensions of the test bar employed were 0.2" x 0.5" and that a span of 1.5" was used.

*Example 5*

A mixture consisting of 92.5 parts by weight of styrene and 7.5 parts by weight of methyl beta-cyanoacrylate was copolymerized in the absence of a catalyst for 45 hours at a temperature of 67° C. At the end of this time the viscous reaction mass was poured into ethanol which is a solvent for the monomer and a non-solvent for the polymer. The precipitated polymer had a nitrogen content of 3.28%, which value indicates a methyl beta-cyanoacrylate content of 26%. It was soluble in benzene and dioxane, insoluble in ethanol, and had a melting point of 230° C., a softening point of 142° C. and a decomposition point of 217° C., as determined on the Maquenne bar. Clear, colorless molded test specimens prepared therefrom showed the following mechanical strength, as compared to polystyrene prepared under substantially the same polymerizing conditions:

| | Flexural Strength, lbs./sq. in. | Tensile Strength, lbs./sq. in. | Impact Strength, (arbitrary units) |
|---|---|---|---|
| Copolymer | 13,200 | 7,700 | 12.0 |
| Polystyrene | 11,000 | 6,500 | 9.0 |

The above values for flexural strength were determined as described in Example 3. The above values for tensile strength were determined by employing a model J-2 Scott tester and a test bar of the polymer measuring 0.08" x 0.5" x 2". Evaluations of the impact strengths were made by employing a modification of the cantilever beam (Izod) impact machine described in the American Society for Testing Materials, Specification D256-41T and found on pages 339 and 342 of the American Society for Testing Materials, Book of Standards, 1941 supplement, volume III.

Instead of the styrene mentioned in the above examples, divinylbenzene, vinylnaphthalenes, such as alpha-vinylnaphthalene, vinylmethylnaphthalenes, and nuclear substituted styrenes such as the halogenated or alkylated ortho-, meta- or para-substituted styrenes, etc., may be employed with good result. The invention is also suitable for the production of ternary copolymers comprising styrenes, the present unsaturated ester-nitriles and another polymerizable compound, for example, an ester of acrylic or methacrylic acid, vinyl esters, diolefins such as butadiene, etc., the presence of said unsaturated ester-nitriles in the polymerizing mixtures having the effect of improving the thermal characteristics of the resulting resinous products.

What I claim is:

1. The process for producing resinous products comprising polymerizing a mixture containing styrene together with from 1% to 50% by weight of said mixture of a compound having the general structure:

where R and X together are selected from the group consisting of: H and H, H and Cl, H and CH₃ and CH₃ and H, and Y is a member of the class consisting of H and saturated hydrocarbon radicals of from 1 to 5 carbon atoms.

2. The process for producing a resinous product comprising polymerizing a mixture of styrene and methyl-beta-cyanoacrylate said methyl-beta-cyanoacrylate consisting of from 1% to 50% by weight of said mixture.

3. The process for producing a resinous product comprising polymerizing a mixture containing styrene and ethyl alpha-chloro-beta-cyanoacrylate said ethyl alpha-chloro-beta-cyanoacrylate consisting of from 1% to 50% by weight of said mixture.

4. The process for producing a resinous product comprising polymerizing a mixture containing styrene and ethyl beta-cyanocrotonate said ethyl beta-cyanocrotonate consisting of from 1% to 50% by weight of said mixture.

5. The copolymer of styrene and from 1% to 50% by weight of said copolymer of methyl beta-cyanoacrylate.

6. The copolymer of styrene and from 1% to 50% by weight of said copolymer of ethyl alpha-chloro-beta-cyanoacrylate.

7. The copolymer of styrene and from 1% to 50% by weight of said copolymer of ethyl beta-cyanocrotonate.

DAVID T. MOWRY.

REFERENCES CITED

The following references are of record in the file of this patent:

UNITED STATES PATENTS

| Number | Name | Date |
|---|---|---|
| 2,396,785 | Hanford | Mar. 19, 1946 |